US006137385A

United States Patent [19]

Conway et al.

[11] Patent Number: 6,137,385

[45] Date of Patent: Oct. 24, 2000

[54] CIRCUIT BREAKER WITH SIDE WALL OPENING FOR A SEPARATE AUXILIARY DEVICE ACTUATION LEVER

[75] Inventors: Christopher J. Conway, Allison Park; Robert W. Mueller, Aliquippa; Thomas A. Whitaker, North Huntingdon, all of Pa.

[73] Assignee: Eaton Corporation, Cleveland, Ohio

[21] Appl. No.: 09/376,815

[22] Filed: Aug. 18, 1999

[51] Int. Cl.[7] .................................................. H01M 13/04

[52] U.S. Cl. .......................... 335/202; 335/132; 335/172

[58] Field of Search .................................. 335/6, 20–25, 335/35, 40–45, 165–176, 132, 202; 218/154, 155

[56] References Cited

U.S. PATENT DOCUMENTS

| | | | |
|---|---|---|---|
| 4,801,906 | 1/1989 | Morris et al. ............................ | 335/17 |
| 4,913,503 | 4/1990 | Castonguay et al. .................. | 335/172 |
| 4,939,490 | 7/1990 | Bernier et al. ........................... | 335/17 |
| 5,036,303 | 7/1991 | Papallo, Jr. et al. ................... | 335/202 |
| 5,512,720 | 4/1996 | Courert et al. ......................... | 200/400 |
| 5,910,760 | 6/1999 | Malingowski .......................... | 335/167 |
| 5,921,380 | 7/1999 | Beck . | |

*Primary Examiner*—Lincoln Donovan
*Attorney, Agent, or Firm*—Martin J. Moran

[57] ABSTRACT

This concerns a molded case circuit breaker having separable main contacts and an operating mechanism utilized to cause the separable main contacts to open and close. A trip unit is provided to actuate the operating mechanism in desirable circumstances. Disposed within the circuit breaker casing is a region for the installation of an auxiliary device, such as a bell alarm device, shunt trip device etc. The case of the auxiliary device has an opening disposed therein through which a movable auxiliary device lever protrude. The opening of the circuit breaker case has a region for interfacing with the operating mechanism of the circuit breaker. A separate lever is disposed between the operating mechanism and the auxiliary device lever member. This separate lever member is driven by the operating mechanism of the circuit breaker and actuates the lever of the auxiliary device. It is pivoted about a protrusion on the auxiliary device.

7 Claims, 9 Drawing Sheets

10

CIRCUIT BREAKER WITH SIDE WALL OPENING FOR A SEPARATE AUXILIARY DEVICE ACTUATION LEVER

CROSS REFERENCE TO RELATED APPLICATIONS

The subject matter of this invention is related to concurrently filed, co-pending applications: U.S. patent application Serial No. 09/377,001, [Eaton Docket No. 97-PDC-505,] filed Aug. 18, 1999, entitled "Circuit Breaker With Easily Installed Removable Trip Unit"; U.S. patent application Ser. No. 09/377,013, [Eaton Docket No. 99-PDC-153,] filed Aug. 18, 1999, entitled "Circuit Breaker With Externally Lockable Secondary Cover Latch"; U.S. patent application Ser. No. 09/376,897, [Eaton Docket No. 99-PDC-220,] filed Aug. 18, 1999, entitled "Circuit Breaker With Lockable Trip Unit Adjustment Cover"; U.S. patent application Ser. No. 09/376,920, [Eaton Docket No. 99-PDC-221,] filed Aug. 18, 1999, entitled "Circuit Breaker With Combined Slot Motor, Reverse Loop And Terminal Strap"; U.S. patent application Ser. No. 09/376,248, [Eaton Docket No. 99-PDC-222,] filed Aug. 18, 1999, entitled "Circuit Breaker With Combination Push-To-Trip And Secondary Cover Latch"; U.S. patent application Ser. No. 09/376,265, [Eaton Docket No. 99-PDC-223 ] filed Aug. 18, 1999, entitled "Multi-Pole Circuit Breaker With Multiple Trip Bars"; U.S. patent application Ser. No. 09/376,816, [Eaton Docket No. 99-PDC-225,] filed Aug. 18, 1999, entitled "Circuit Breaker With Trip Unit Mounted Tripping Plunger And Latch Therefore", U.S. patent application Ser. No. 09/377,018, [Eaton Docket No. 99-PDC-226,] filed Aug. 18, 1999, entitled "Circuit Breaker With Non-Symmetrical Terminal Collar"; and U.S. patent application Ser. No. 09/376,254, [Eaton Docket No. 99-PDC-247,] filed Aug. 18 1999, entitled "Circuit Breaker With Dial Indicator For Magnetic Trip Level Adjustment".

BACKGROUND OF THE INVENTION

1. Field of the Invention

The subject matter of this invention is related generally to molded case circuit breakers and more specifically to auxiliary device levers for molded case circuit breakers.

2. Description of the Prior Art

Molded case circuit breakers are well known in the art as exemplified by U.S. Pat. No. 5,910,760 issued Jun. 8, 1999 to Malingowski et al., entitled "Circuit Breaker with Double Rate Spring" and assigned to the assignee of the present application. The foregoing is incorporated herein by reference.

Molded case circuit breakers include a set of separable main contacts, one of which is usually fixed and one of which is movable for automatically opening upon the occurrence of an overload or short circuit electrical current in the network which the circuit breaker is provide to protect. The separable main contacts are opened as a result of the functioning of a latched operating mechanism, which is interconnectable by way of an operating handle to a region outside of the circuit breaker. The operating handle may be used to trip the circuit breaker manually or to reset and close the circuit breaker contacts once they have been opened automatically. The reset action is required because circuit breakers must be mechanically charged to be in a state to reopen immediately upon closure in the event that the fault which cause the tripping in the first place has not disappeared. The reset action charges the circuit breaker for that purpose. Molded case circuit breakers have trip units, which are often removably insertable in the circuit breaker case.

The trip unit in addition has at least two calibratable functions, one of which is generally identified as thermal tripping and the other of which is generally identified as magnetic tripping. The trip unit includes a rotatable trip bar, which when rotated will actuate a latchable tripping operation within the operating mechanism to automatically open the circuit breaker contacts. The rotatable trip bar is usually actuated in one of two ways. The first way is in response to what is called a magnetic tripping of the circuit breaker. This occurs when the amount of current flowing through the separable main contacts of the circuit breaker is so high as to represent a potential catastrophic failure and which therefore requires exceedingly quick opening action of the circuit breaker. In such a case a electron magnetic core, which produces magnetic flux in proportion to the amount of electrical current flowing through the separable main contacts attracts a movable armature, the movement of which eventually causes the trip bar to move to thus cause the tripping action. The second tripping occurrence is in response to a relatively low amount of overload current, which eventually will cause overheating of the electrical wires in the circuit to be protected, but which does not necessitate the instantaneous action a short circuit requires and thus does not require the magnetic action spoken of previously. In this case a bi-metal element is heated by a heater element which conducts the electrical current flowing through the separable main contacts. As the bi-metal element flexes or moves it impinges upon the tripping bar causing it to flex and move correspondingly, until eventually a point is reached in which the tripping bar causes the circuit breaker to unlatch and trip automatically. Both the magnetic trip mechanism and the thermal trip mechanism usually require initial calibration.

In one half of an AC cycle, the electrical current flows through the circuit interrupter from the load by way of a terminal collar to the load terminal of the circuit breaker and from there into the trip unit where it flows through the previously mentioned heater which in turn is serially connected to the electron magnetic member of the magnetic trip device. From there it is interconnected by way of a flexible cable to one end of a moveable contact arm and from there to the main contact on the moveable contact arm. When the contact arm is closed, it is closed upon a fixed contact which is supported usually on unshaped conductor, which in turn is interconnected with a line terminal and there to the line terminal collar and finally to the electrical line. In addition the circuit breaker usually has an arc chute for assisting in diminishing the electrical arc drawn between the separating contacts during the opening operation for extinguishing of the arc. The circuit breaker also has a slot motor arrangement, which is utilized to interact magnetically with the electrical current flowing in the opening contact arm to accelerate the opening of the contact arm magnetically. The operating mechanism usually consists of a series of levers and linkages, which are interconnected with the separable main moveable contact arm, the handle mechanism, and by way of a latch arrangement with the aforementioned trip bar. Description and operation of all of the above may be found in the previous mentioned, incorporated by reference '760 patent.

Circuit breakers often have pockets for bell alarms and the like in the circuit breaker cases. Into this pocket may be inserted an accessory, such as a bell arm which has a actuating protrusion which fits sideways into an opening in an inner side wall of the case for interaction with the circuit breaker operating mechanism for being actuated by the circuit breaker operating mechanism. Such an example is found in U.S. Pat. No. 5,921,380 issued Jul. 13, 1999 to Beck et al., and entitled "Circuit Interrupter with Covered Accessory Case with Accessory Having Lock-End Feature and Pull Tab". It would be advantageous if an arrangement such as that could be found, which was easily installed in a circuit breaker pocket.

SUMMARY OF THE INVENTION

In accordance with the invention there is provided a circuit interrupter having a housing with a pocket for an auxiliary device. There is an operating mechanism disposed within the housing. Separable contacts are disposed within the housing in cooperation with the operating mechanism for being opened by the operating mechanism. An adjustable trip unit is disposed within the housing in cooperation with the operating mechanism for actuating the operating mechanism for opening the separable contacts. The operating mechanism has an operating mechanism member which attains a predetermined position in the housing upon the occurrence of a circuit interrupter status. The operating mechanism member is accessible through an opening in the housing at the pocket. An auxiliary device having a reaction member for reacting to the occurrence of the circuit interrupter status is present. A lever, separate from both the auxiliary device and the housing, and movable in the pocket for interlinking the operating mechanism member with the reaction member by way of the opening in the housing interconnects the axuiliary device and the operating mechanism.

BRIEF DESCRIPTION OF THE DRAWINGS

In accordance with the invention, reference may be had to the preferred embodiment thereof, shown in the accompanying drawings in which.

DESCRIPTION OF THE PREFERRED EMBODIMENT

Figure 1:
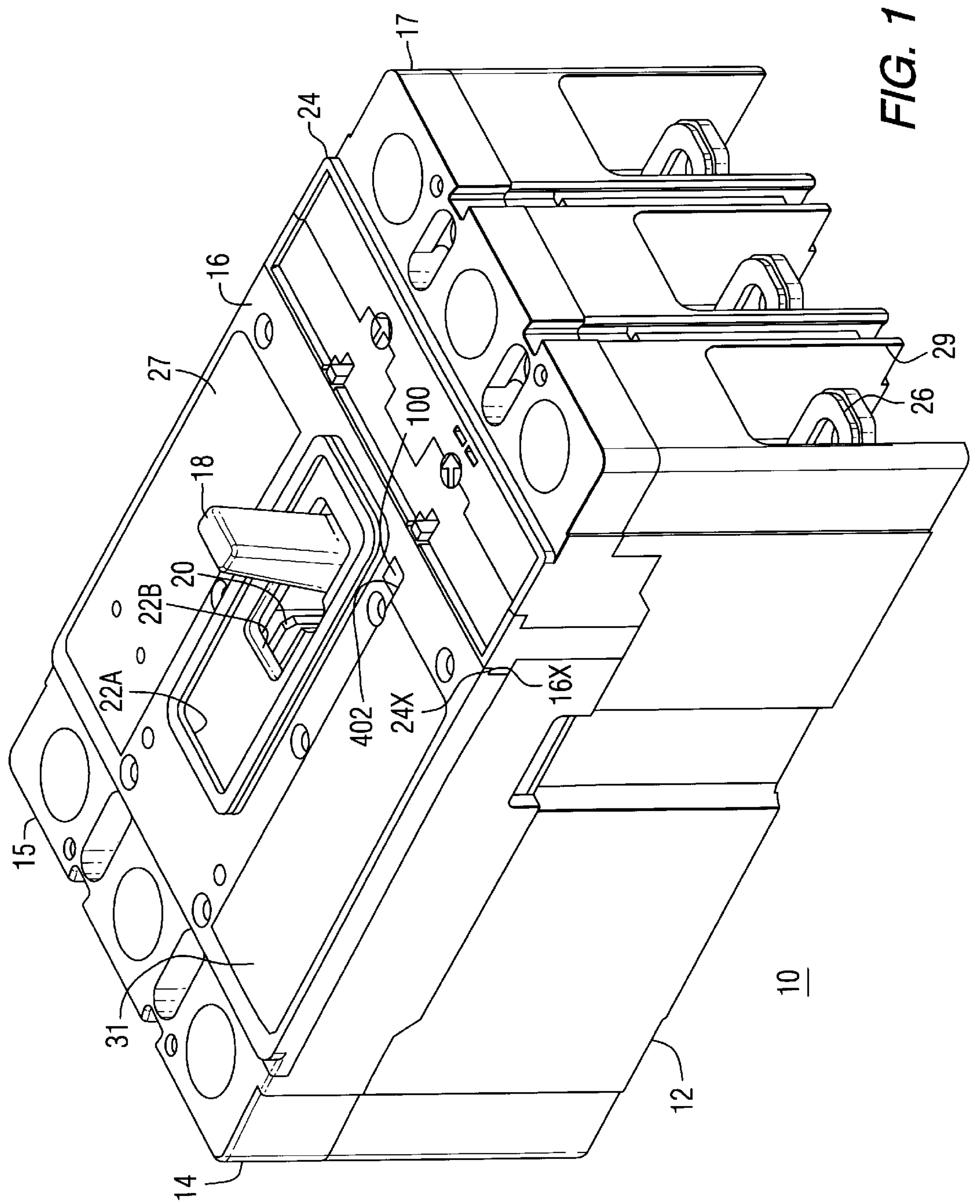
FIG. 1 is an orthogonal view of a three-phase molded case circuit breaker employing embodiments of the present invention.

Referring now to the drawings and FIGS. 1 through 4 in particular, there is shown a molded case circuit breaker or interrupter 10 having a main base 12 and primary cover 14. Attached to the primary cover 14 is a secondary cover 16. A handle 18 extends through a secondary escutcheon 22A in the secondary cover 16 and aligned primary escutcheon 22B in the primary cover 14. An operating mechanism 20 is interconnected with the handle 18 for opening and closing separable main contacts in a manner which will be described hereinafter. This circuit breaker has a line end 15 and load end 17. The circuit breaker or interrupter includes a removable trip unit 24. Removable trip unit 24 has an underlapping lip 24X. There are also depicted a load terminal 26, a right side accessory region or pocket 27 and a left side accessory pocket or region 31.

Figure 2:
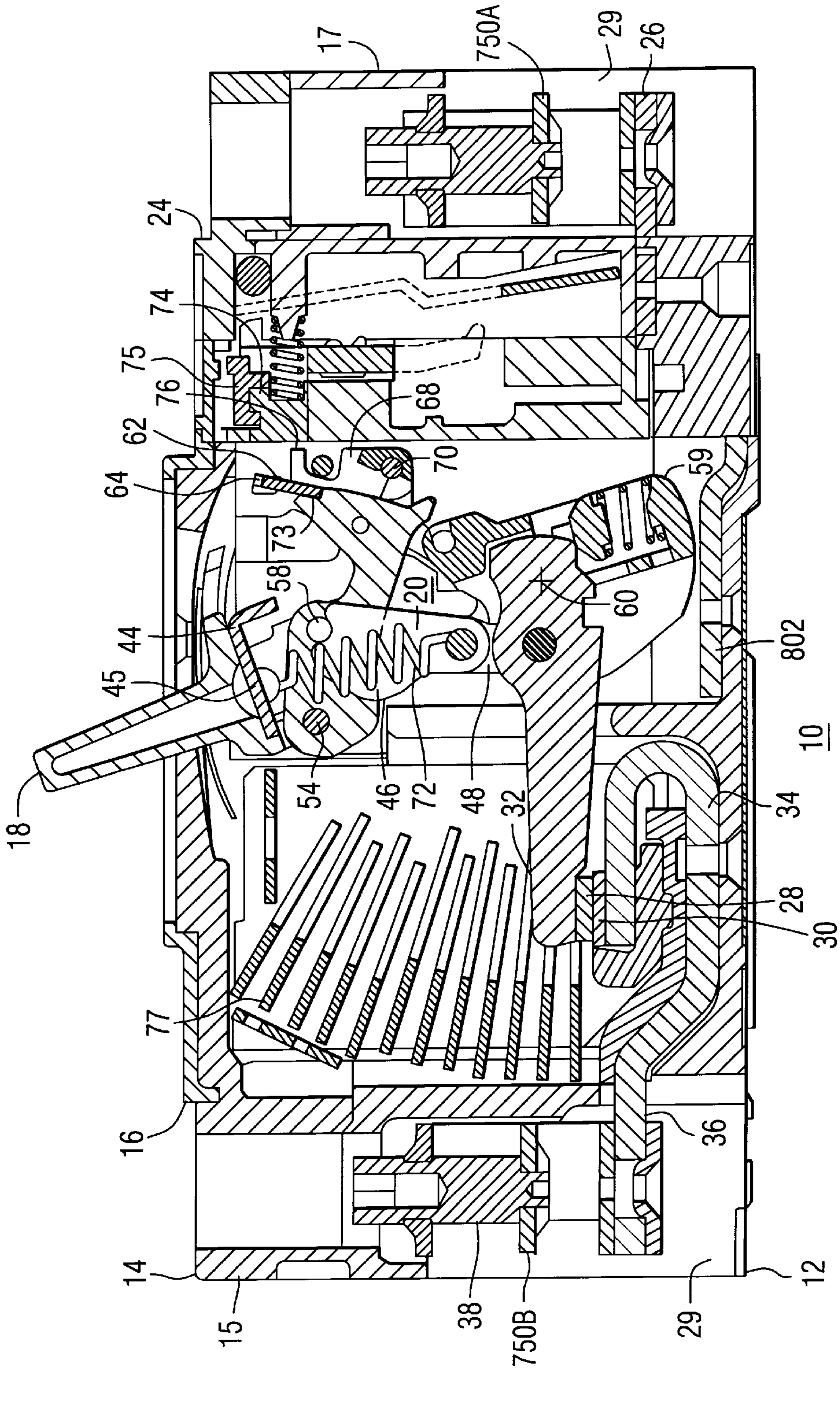
FIG. 2 is a cut away side elevation section of the circuit breaker of FIG. 1, depicting the circuit interrupter in the closed state.
Figure 3:
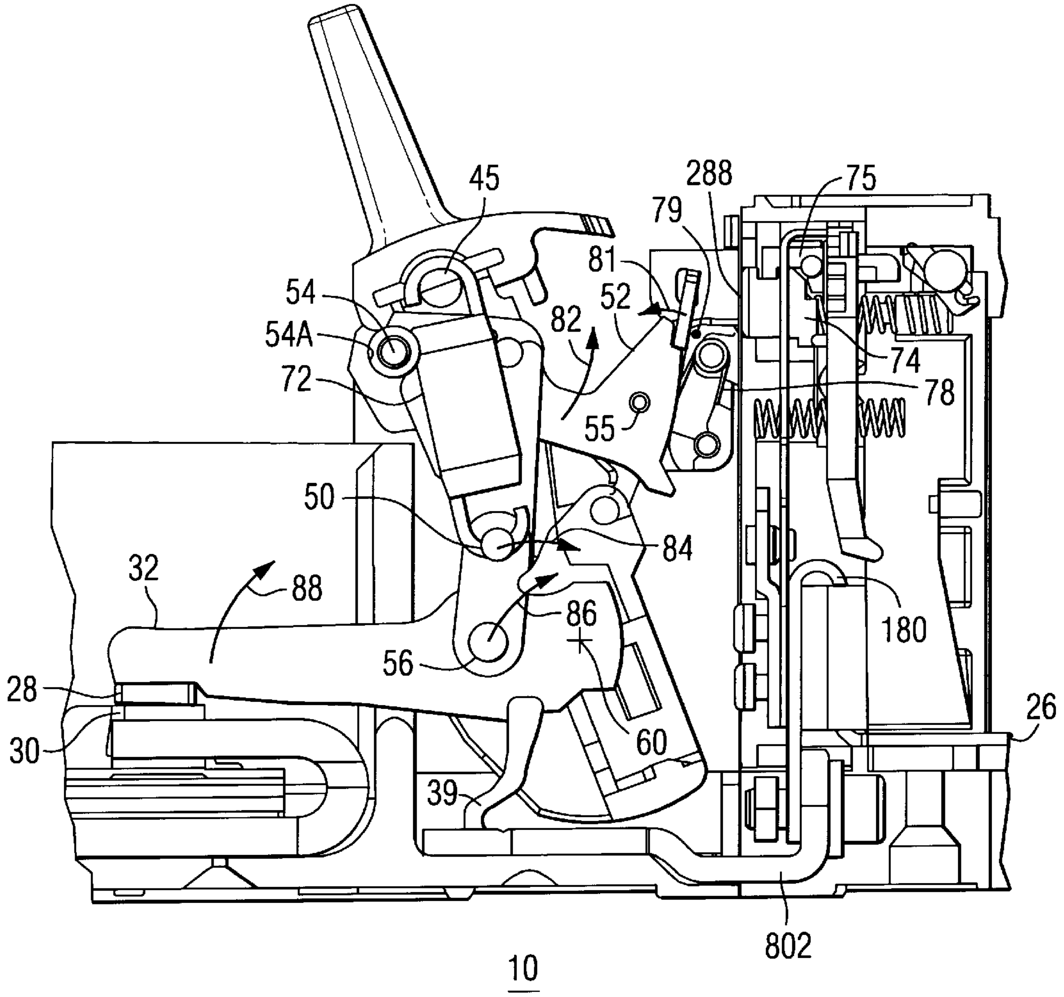
FIG. 3 is a side elevation view similar to that shown in FIG. 2, concentrating on the circuit breaker operating mechanism and trip unit.
Figure 4:
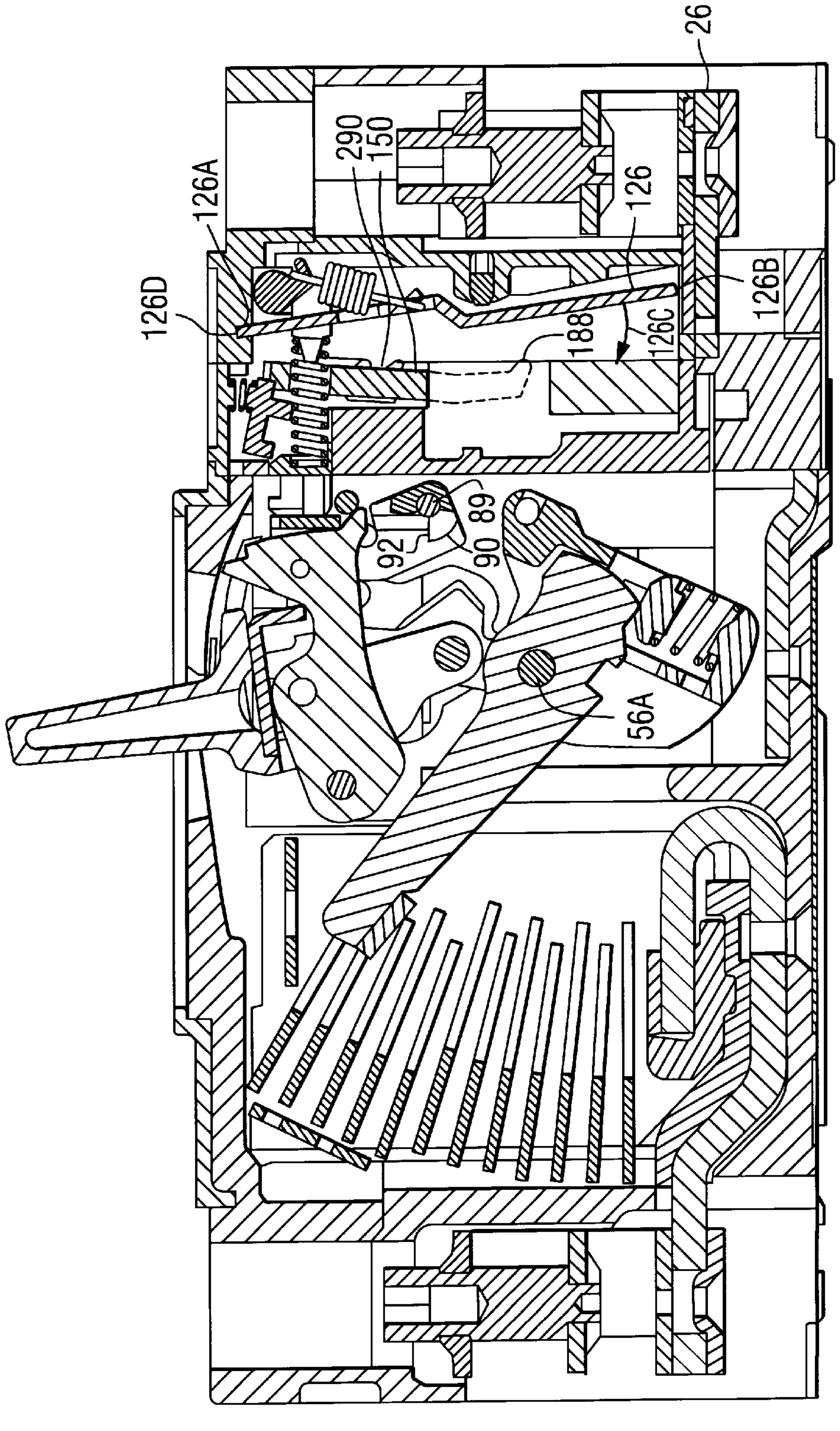
FIG. 4 is similar to FIG. 2, but depicts the circuit interrupter in the tripped state.

Referring now more specifically to FIGS. 2, 3 and 4, there are depicted a separable movable contact 28 disposed upon a moveable contact arm 32 and a fixed contact 30 disposed upon a fixed contact support or u-shaped member 34. Line terminal 36 is disposed to the left in FIG. 2, for example, at the line end 15 of the circuit interrupter in a terminal cave or pocket 29. A load terminal 26 is disposed to the right in FIG. 2, for example, in a load terminal cave or pocket 29. To the left on the line terminal 36 is disposed a line terminal collar 38 which will be described in more detail hereinafter, and to the right is provided a load terminal jumper-to-movable contact arm conductor 802. Connected to conductor 802 is a flexible conductor 39, which is interconnected with movable contact arm 32 as shown schematically. The load terminal jumper or frame conductor 802 is interconnected at its other end with a bi-metal heater 180, which in turn is interconnected at its other end with the terminal 26. Consequently, when the circuit interrupter separable main contacts 28 and 30 are closed upon each other, there is a complete circuit through the circuit interrupter from right to left starting with line conductor 26 through bi-metal heater 180, through load terminal jumper or frame conductor 802, through flexible conductor 39, through the movable contact arm 32, through contact 28 to contact 30 and from there through the fixed contact support or u-shaped member 34 to line terminal 36.

There is provided a operating mechanism 20 for assisting in opening and closing the separable main contacts 28 and 30. In particular, the operating mechanism includes a cradle 52, which is pivoted on one end at a cradle fixed pivoted pin 54 by way of an opening 54A in the cradle for placement of the cradle fixed pivoted pin therein. The cradle includes a cradle-to-side accessory region side protrusion 55. There is provided an upper toggle link 46 and a lower toggle link 48. They are joined pivotally by an upper and lower toggle link pin 50. There is provided a lower toggle link to movable contact arm main pivot assemble attachment pin 56, which is affixed to the movable contact arm 32 at an opening 56A. There is also a cradle to upper toggle link pivot pin 58, by which the upper toggle link 46 is placed in physical contact with the cradle 52. There is also provided a movable contact arm main pivot assembly 59, which movably, rotatably pivots on a pivot 60. There is also provided a primary frame latch 62 which operates or rotates on a primary frame latch pivot 64. The primary frame latch 62 cooperates with a secondary frame latch 68, which rotates on a secondary frame latch pivot 70. The operating power for the tripping operating of the circuit breaker is provided by a charged main toggle coil spring 72. The main toggle coil spring is interconnected with a handle yoke 44 by way of a handle yoke attachment post 45. The other end of the spring 72 is attached to the toggle link pin 50. Cradle 52 has a cradle lip 73, which is captured or held in place by the primary latch 62 when the separable main contacts 28 and 30 are closed.

No tripping of the circuit breaker can take place by way of the operating mechanism until the aforementioned primary frame latch 62 has been actuated away from the cradle lip 73 in a manner which will be described hereinafter. There is provided a combination secondary-frame-latch-primary-frame-latch torsion spring 78, which exerts force against both latches sufficient to cause appropriate movement thereof at the appropriate time. The secondary frame latch has a laterally extending trip protrusion 79, the purpose of which will be described later hereinafter. Actuation of the primary and secondary frame latches occurs exclusively by way of the utilization of a resetable trip unit trip plunger 74, which is contained entirely within the removable trip unit 24. The trip unit trip plunger 74 is controlled or latched by way of a plunger latch or interference latch 75. The secondary frame latch 68 is in disposition to be struck by the moving trip unit plunger abutment surface 288. Upon opening of the separable main contacts 30 and 28, an electric arc is drawn therebetween which is exposed to an arc chute 77. The secondary frame latch 68 has a bottom portion 89, upon which is disposed an arcuate stop surface 90 for the primary frame latch 62. There is also provided above that arcuate stop surface and as part of the acruate stop member a latch surface 92.

The operating mechanism described herein may be the same as found in U.S. Pat. No. 5,910,760 issued Jun. 8, 1999 to Malingowski et al., entitled "Circuit Breaker with Double Rate Spring". Thought the primary and secondary frame latches are disposed within the case 12, the trip unit plunger 75 is responsible for initiating all tripping action from the trip unit 24 into the region of the secondary latch 68. Alternatively, the secondary latch 68 may be actuated by a push-to-trip button in a manner, which will be described hereinafter. The secondary latch 68 is actuated to rotate to the left as shown in FIGS. 2, 3 and 4, for example, in direction 81 about its pivot 70. As this occurs the acruate stop surface 90 for the secondary frame latch 68 rotates away from the bottom of the primary frame latch 62 until the lateral latch surface 92 rotates into a disposition to allow the bottom of the primary frame latch 62 to rotate to the right under the force of the cradle 72. This causes the primary frame latch 62 to clear the lip 73 of the cradle 52 to allow the cradle 52 to rotate upwardly about its pivot 54 in a direction 82 under the power of the now collapsing coil spring 72 by way of the force exerted thereupon by the upper toggle link 46 acting against the cradle-to-upper-toggle link connecting pin 58. As the toggle spring 72 relaxes, the upper and lower toggle links collapse, which in turn causes the lower toggle link to movable contact arm pivot assembly 56 to rotate upwardly in the direction 86 about its pivot 60. This, of course, causes the contact arm 32 to rotate similarly in the direction 88, thus opening the separable main contacts 28 and 30 and in most cases establishing an electrical arc of conducting electrical current there across. The action of the secondary frame latch 68 can be duplicated by causing secondary latch push-to-trip member side laterally extending trip protrusion 79 to rotate in the direction 81 by operation of a push-to-trip member which will be described later hereinafter. Resetting of the circuit breaker is accomplished in a matter well known in the prior art and described and shown with respect to the aforementioned U.S. Pat. No. 5,910,760. The important part of the operation with respect to this feature is the movement of the secondary frame latch point 76 in the direction opposite to direction 82, against the plunger face 288 in a manner, which will be described later hereinafter. However, if movement of the plunger face 288 in the rightward direction against its plunger spring, as will be described hereinafter, is prevented because of the latching of the plunger member 74, in a manner which will be described hereinafter, then the circuit breaker can not be reset. An important feature of the invention lies in the fact that the ultimate control of the resetting of the circuit breaker and tripping of the circuit breaker can be accomplished only from the removable trip unit 24, rather than from the operating mechanism 20.

Figure 5:
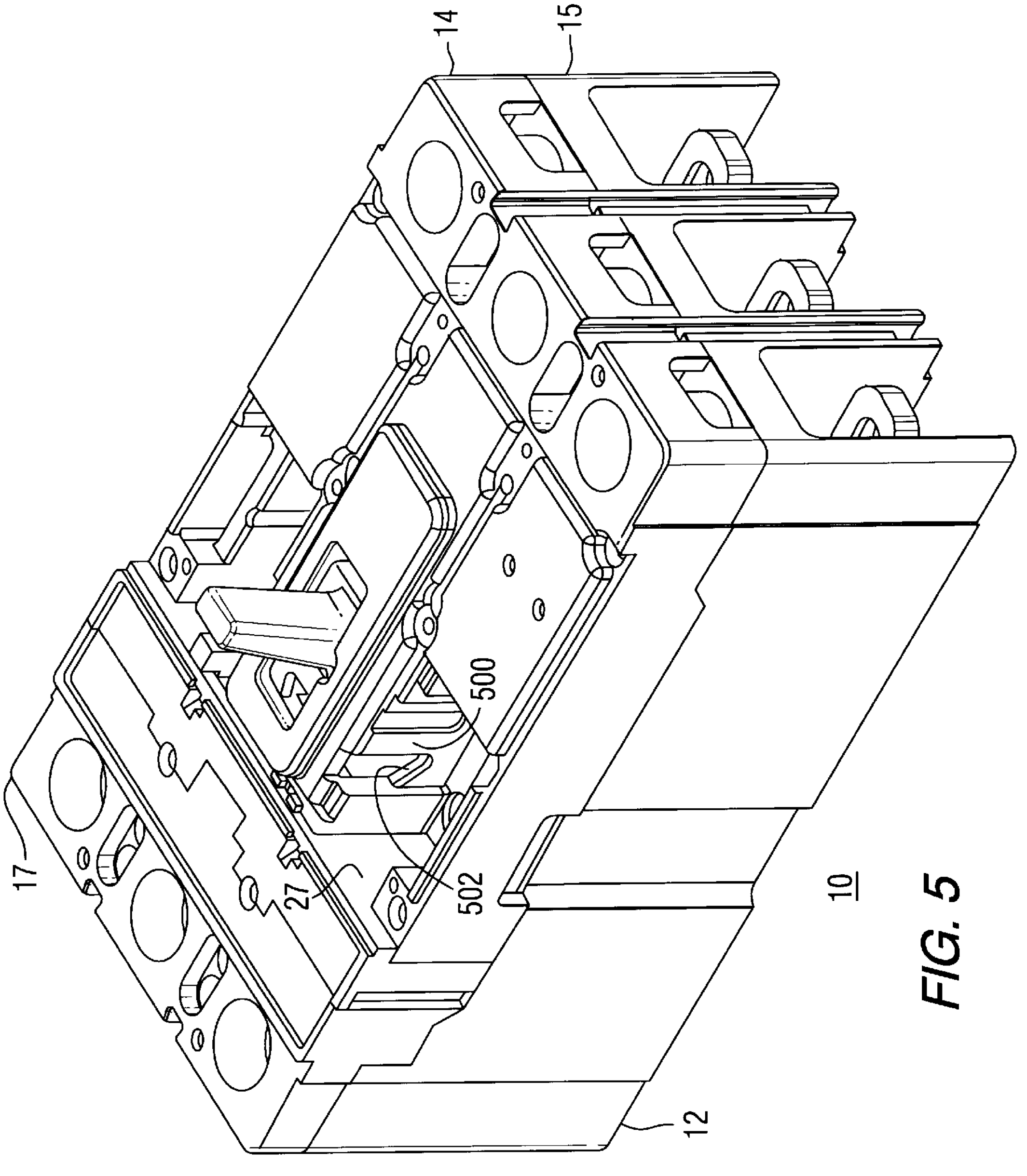
FIG. 5 shows the circuit breaker apparatus of FIG. 1 in an orthogonal view from the opposite side.

Referring now to FIGS. 5 through 11, an embodiment of the invention is depicted. In particular, FIG. 5 shows the circuit breaker 10 in a 180 degree rotated disposition with respected to that shown in FIG. 1. In this depiction the load end 17 is shown to the left and the line end 15 is shown to the right. In the primary cover 14 is disposed in the right accessory case opening 27, a side wall opening 502 in the vertical side wall 500.

Figure 6:
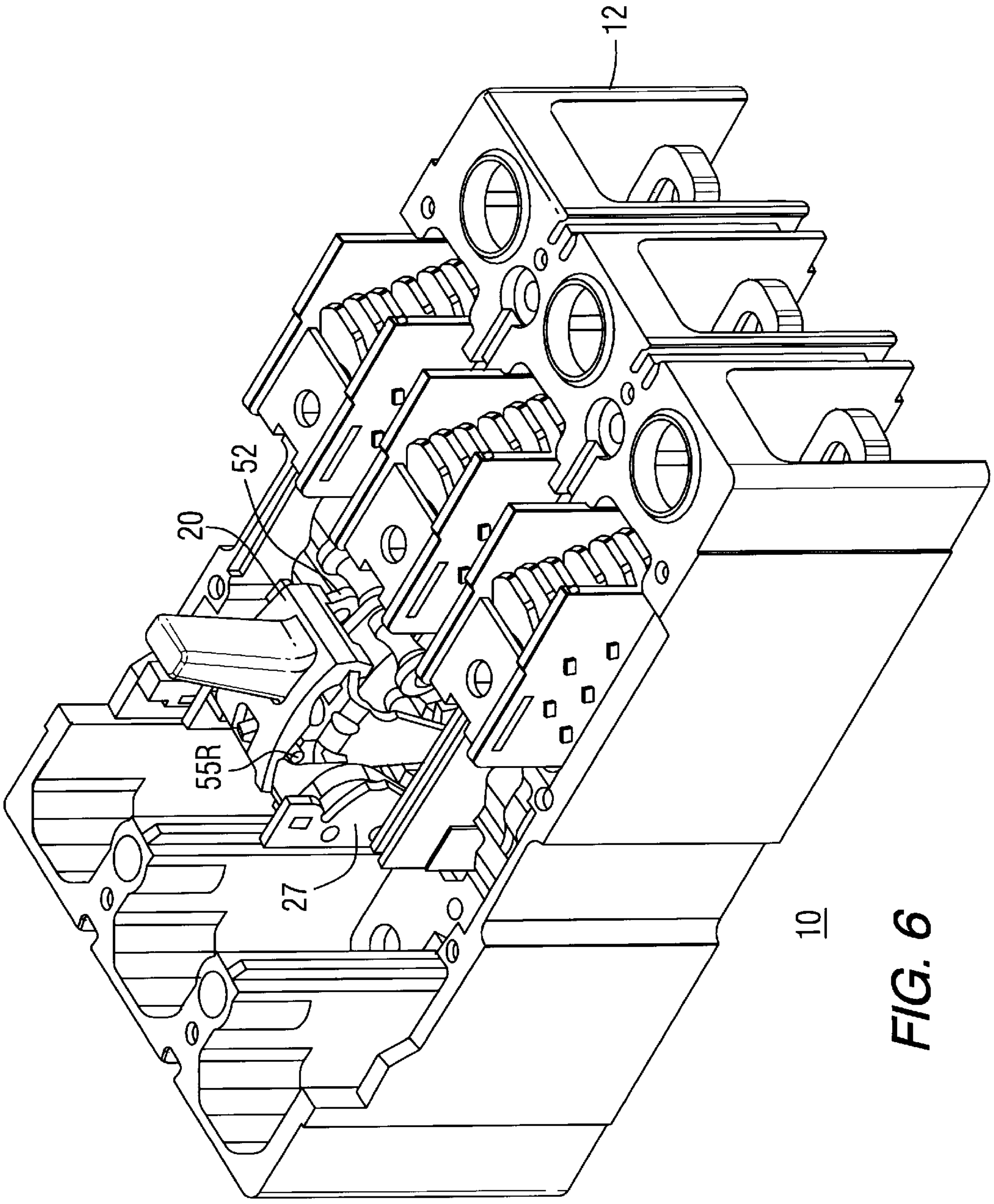
FIG. 6 shows the arrangement of FIG. 5 with the primary and secondary covers removed.

FIG. 6 depicts the circuit breaker 10 in the same arrangement but with the primary cover 14 removed and only the base 12 remaining. In this case, a protruding side protrusion 55R on the cradle 52 of the operating mechanism 20 is accessible from the region 27 through the opening 502 (not shown).

Figure 7:
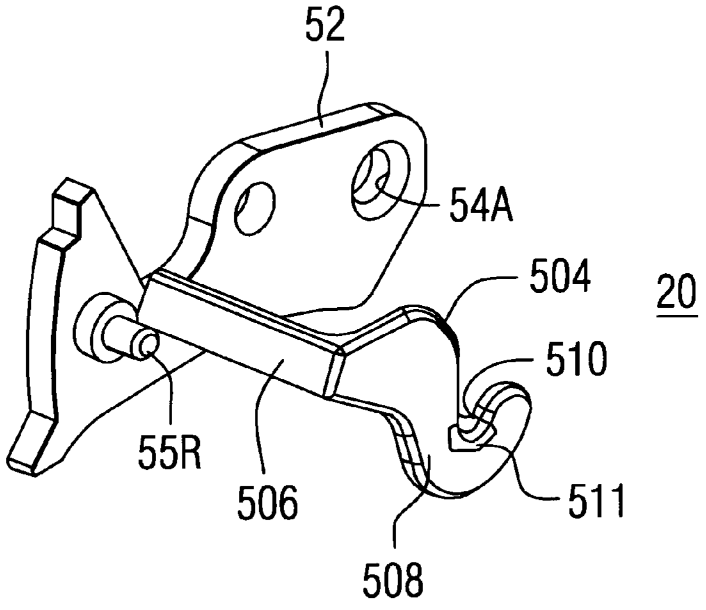
FIG. 7 shows the arrangement of the circuit breaker cradle and the operating-mechanism-to-accessory lever in orthogonal view.
Figure 8:
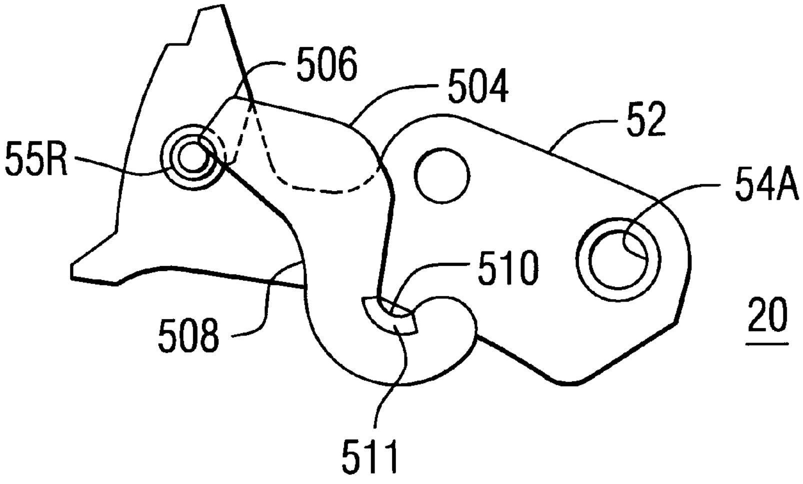
FIG. 8 depicts the arrangement of FIG. 7 in side view.

Referring to FIGS. 7 and 8, the arrangement of the cradle 52 and the embodiment of the present invention is set forth, and the single operating-mechanism-to-accessory-lever main body 504 is depicted. Element 506 is the operating mechanism lever arm, which is disposed to make contact with the outwardly, sidewardly, protruding member 55R of the cradle 52 for operation. Arm 508 depends at a right angle from the arm 506 and is generally flat. There is provided in arm 508 a capture crook or u-shaped concave region 510 having a bearing surface at 511. Thus it can be seen that as cradle member 52 rotates upwardly on its pin 54 (see FIG. 2), which may extend through opening 54A therein, member 55R will catch or abut against arm 506 and cause lever main body 504 to move depending upon how it is anchored or supported at its other arm 508.

Figure 9:
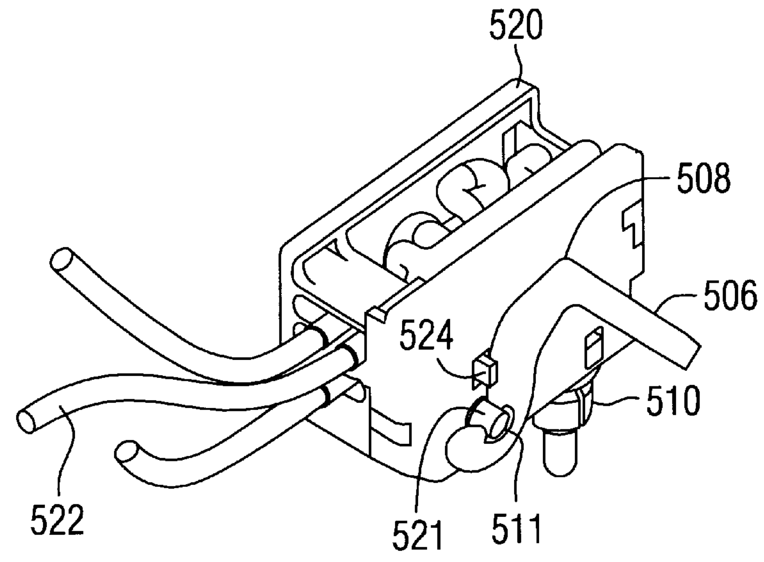
FIG. 9 depicts the interconnection of the lever arrangement of FIGS. 7 and 8 with an accessory member in orthogonal view.
Figure 10:
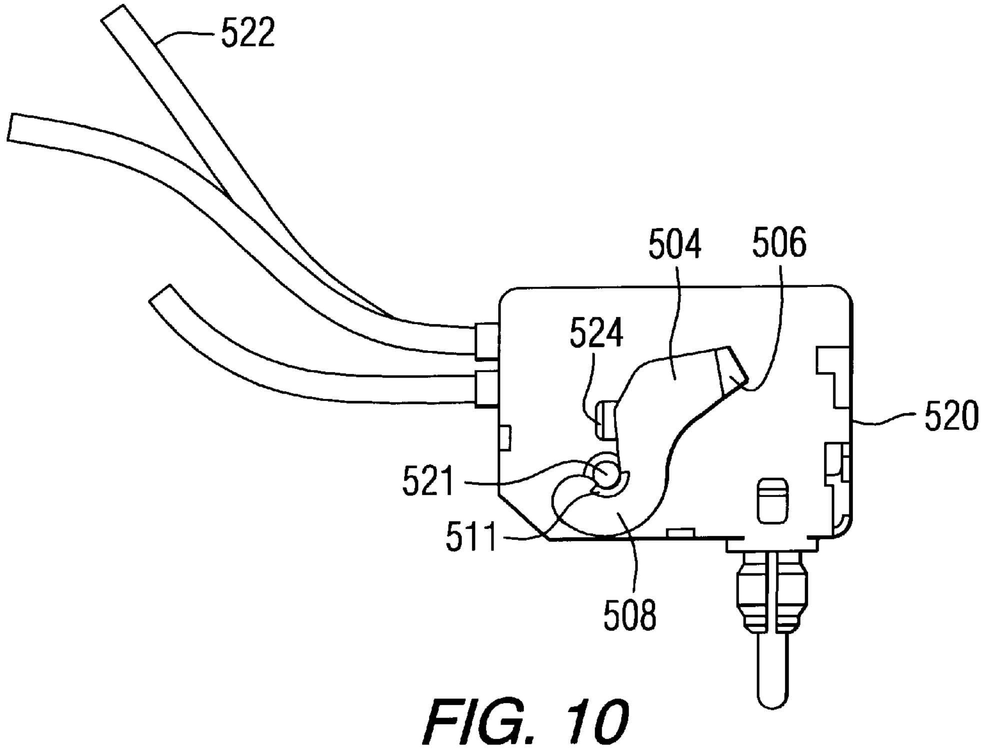
FIG. 10 is a side view of the arrangement of FIG. 9.
Figure 11:
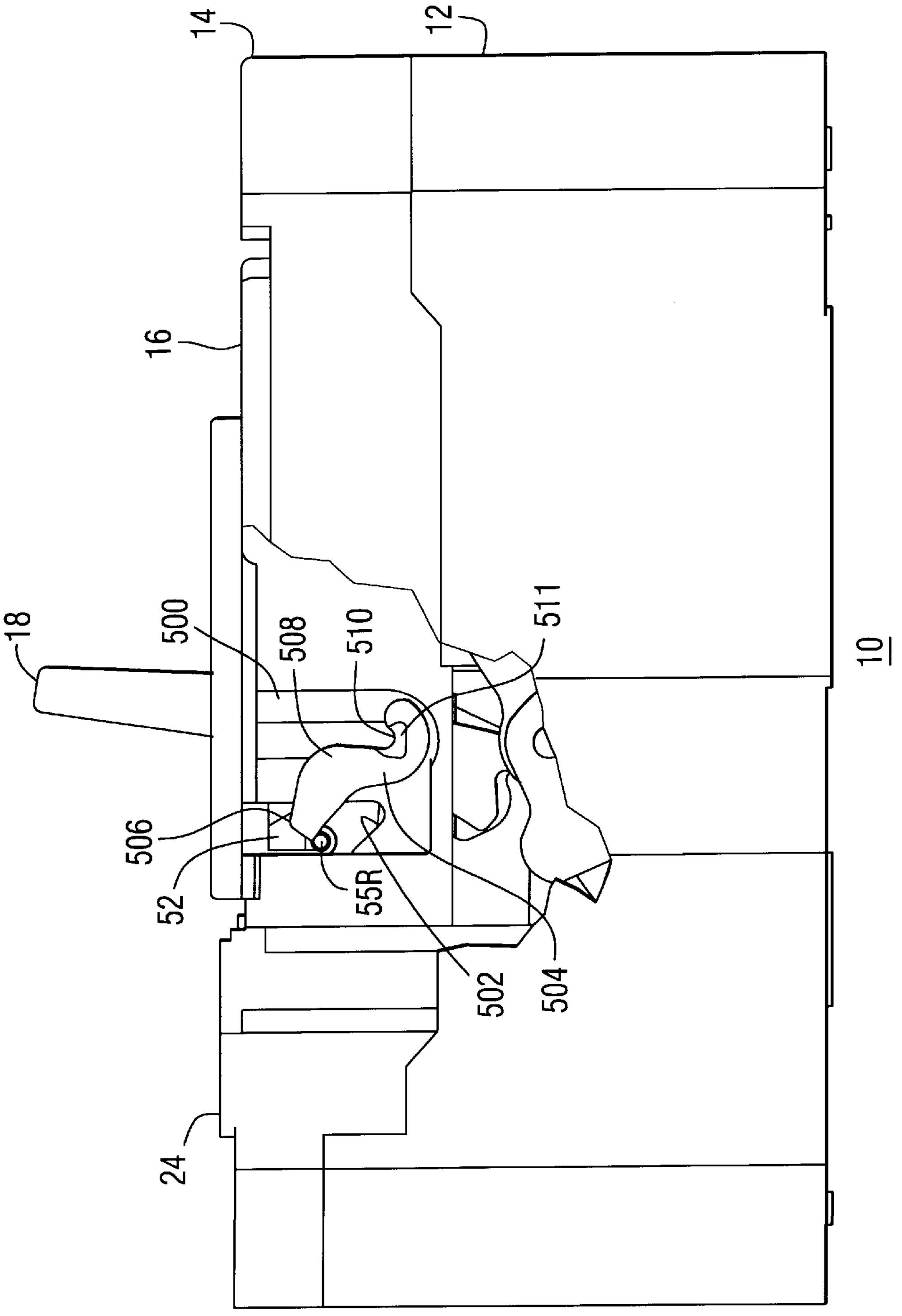
FIG. 11 is a side view of the circuit interrupter of FIG. 5, partially broken away and partially in section, showing the arrangement of FIGS. 7 and 8.

Referring now to FIGS. 9, 10 and 11, the support for arm 508 is clearly shown. Arm 508 is disposed flush against the vertical casing of auxiliary device 520, which may be an auxiliary switch and/or bell alarm device such as is well know in the art. There maybe provided, depending outwardly from the case of the auxiliary device 520 a post 521 around which the crook 510 and bearing surface 511 of the main body lever 504 rotates. Sufficient rotation of the arm 506 by the member 55R in the counterclockwise direction (as viewed in FIG. 9) around the post 521 will cause the arm 508 to impinge upon movable auxiliary lever 524 in the auxiliary device 520. This in turn drives a micro switch or reaction member 520A in the auxiliary device 520, which may cause electrical activity to take place in the wiring 522. This in the present embodiment of the invention, will cause a bell alarm to actuate. Arm 506 is driven in the counterclockwise direction by the member 55R in response to a tripping action of the circuit breaker as represented by the movement of the cradle 52 in a counterclockwise direction around its rotational axis 54 (FIG. 2). The vertical support for the main body 504 is against the side 500 as described previously and shown in FIG. 11.

What we claim as our invention is:

1. A circuit interrupter device, comprising:

a housing with a pocket for an auxiliary device means;

operating a mechanism means disposed within said housing, said operating mechanism means having an operating means member which attains a predetermined position in said housing upon the occurrence of a circuit of a circuit interrupter open or closed status, said operating mechanism means member being accessible through an opening in said housing at said pocket;

separable contact means disposed within said housing in cooperation with said operating mechanism means for being opened by said operating mechanism means;

auxiliary device means having a reaction member for reacting to said occurrence of said circuit interrupter status; and lever means separate from both said auxiliary device means and said housing and movable in said pocket for interlinking said operating mechanism means member with said reaction member by way of said opening in said housing; and wherein said lever means comprises a lever with a u-shaped concave region, wherein said auxiliary device means has an external nub which is complementary with said u-shaped concave region, wherein said u-shaped concave region bears against said nub and rotates around it during operation.

2. The combination as claimed in claim 1, wherein said lever means comprises a substantially flat lever with a transverse protrusion which protrudes into said opening from said pocket to abut against said operating mechanism means member when it attains said predetermined position in said housing upon the occurrence of said circuit interrupter status.

3. The combination as claimed in claim 2, wherein said lever means comprises a lever with a u shaped convex region, wherein said housing has a bearing surface which is complementary with said u shaped convex region, wherein said u shaped convex region bears against said bearing surface and rotates along it during operation.

4. The combination as claimed in claim 3, wherein said reaction member comprises a micro switch.

5. The combination as claimed in claim 4, wherein said auxiliary device means comprises a bell alarm.

6. The combination as claimed in claim 5, wherein said occurrence comprises a circuit interrupter trip operation.

7. A circuit interrupter device, comprising:

a housing with a pocket for an auxiliary device means;

operating mechanism means disposed within said housing, said operating mechanism means having an operating mechanism means member which attains a predetermined position in said housing upon the occurrence of a circuit interrupter open or closed status, said operating mechanism means member being accessible through an opening in said housing at said pocket;

separable contact means disposed within said housing in cooperation with said operating mechanism means for being opened by said operating mechanism means;

auxiliary device means having a reaction member for reacting to said occurrence of said circuit interrupter status; and lever means separate from both said auxiliary device means and said housing and movable in said pocket for interlinking said operating mechanism means member with said reaction member by way of said opening in said housing; and wherein said lever means comprises a lever with a u-shaped convex region, wherein said housing has a bearing surface which is complementary with said u-shaped convex region bears against said bearing surface and rotates along it during operation.

* * * * *